US008185104B2

(12) United States Patent
Walker et al.

(10) Patent No.: US 8,185,104 B2
(45) Date of Patent: May 22, 2012

(54) APPARATUS AND METHOD FOR DIFFERENTIATING SERVICES IN MULTIMEDIA NETWORKS TO ROAMING SUBSCRIBERS

(75) Inventors: John Michael Walker, Alcobendas (ES); Juan Antonio Sanchez Herrero, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1059 days.

(21) Appl. No.: 11/913,527

(22) PCT Filed: May 3, 2005

(86) PCT No.: PCT/SE2005/000641
§ 371 (c)(1),
(2), (4) Date: Nov. 2, 2007

(87) PCT Pub. No.: WO2006/118495
PCT Pub. Date: Nov. 9, 2006

(65) Prior Publication Data
US 2008/0194255 A1 Aug. 14, 2008

(51) Int. Cl.
*H04W 4/00* (2009.01)

(52) U.S. Cl. .................. 455/433; 455/432.1; 455/432.3; 455/434

(58) Field of Classification Search ............... 455/432.1, 455/432.3, 433, 434, 435.1–435.3, 404.2, 455/456.1
See application file for complete search history.

(56) References Cited

U.S. PATENT DOCUMENTS

| 2001/0049790 | A1 | 12/2001 | Faccin et al. | |
| 2006/0077965 | A1* | 4/2006 | Garcia-Martin et al. | 370/352 |
| 2006/0206504 | A1* | 9/2006 | Cai et al. | 707/100 |

FOREIGN PATENT DOCUMENTS

| JP | 2001-119750 A | 4/2001 |
| WO | WO 2004/080092 A | 9/2004 |

* cited by examiner

*Primary Examiner* — Wayne Cai (57) ABSTRACT

The present invention is aimed to the provision of a mechanism whereby roaming users can specify whether they prefer to dial numbers belonging to the home network in local format or in international format from the visited network where they are roaming so that the treatment of restrictions based on the type of call, and depending on both user's geographical location and preferences, are correspondingly applied. Therefore, the present invention provides for a new method whereby information about a location of the user, taking into account the access location and user preferences, is sent from a home subscriber server to a serving call session control function entity, both in the home network for the user.

10 Claims, 9 Drawing Sheets

APPARATUS AND METHOD FOR DIFFERENTIATING SERVICES IN MULTIMEDIA NETWORKS TO ROAMING SUBSCRIBERS

FIELD OF THE INVENTION

The present invention generally relates to services to be applied depending on subscriber roaming information at an entity included in multimedia infrastructure of a home operator. More specifically, the invention relates to services to be applied when the subscriber accesses an entry node of the multimedia infrastructure through a selected access network, where the access network and the entry node of the multimedia infrastructure do not correspond to a same subscriber location.

BACKGROUND

Nowadays, the $3^{rd}$ Generation Partnership Project (generally known as "3GPP") is developing a so-called IP Multimedia subsystem (generally known as "IMS"), which is described in the 3GPP document "Technical Specification Group Services and System Aspects; IP Multimedia (IM) Subsystem (3GPP TS 23.228 version 6.8.0)" (hereinafter referred to as 3GPP TS 23.228). This IP Multimedia subsystem (IMS) comprises elements for provision of multimedia services, such as voice, video, messaging, data and web-based technologies, as well as communications with legacy telephony systems. In a wide context, the IP Multimedia subsystem (IMS) thus includes a collection of signalling and bearer related network elements for providing its users with IP multimedia services. These IP multimedia services are based on an IETF defined session control capability that, along with multimedia bearers, utilises the IP-Connectivity. In this context, the multimedia session is the signalling corresponding to multimedia bearers.

Generally speaking, a user accesses to the IP Multimedia subsystem through an access network where the user has previously attached himself and from where the user gets IP connectivity. In particular, the IP Multimedia subsystem may have infrastructure in a Public Land Mobile Network (PLMN) where the user is a subscriber, namely in the Home PLMN (HPLMN) or home network, or in a Visited PLMN (VPLMN) or visited network where the user is roaming.

The IP Multimedia subsystem (IMS) is aimed to be an access-independent domain under the umbrella of the 3GPP standardization bodies, and may be thus accessible through any access network operating in accordance with a General Packet Radio System (GPRS) network, or a Wireless Local Area Network (WLAN) hotspot, or a Broadband network, or a Code Division Multiple Access (CDMA) network such as a so-called CDMA2000 or a Wideband CDMA (WCDMA), or even a wired-line network, the latter with minimal adaptations.

Once the user has attached to a selected access network, the user submits to the access network, implicitly or explicitly, an indication to further register into the IP Multimedia subsystem in order to get IP connectivity and to be assigned an entry node to said IP Multimedia subsystem by means of appropriate protocol mechanisms available at the selected access network. In accordance with the above 3GPP TS 23.228, this entry node to the IP Multimedia subsystem is a so-called Proxy Call Session Control Function (P-CSCF) that behaves like a Proxy by accepting requests and servicing them internally, or forwarding them towards another entity like an Application Server.

The registration of a user into the IMS through a selected access network is nowadays carried out with a so-called Session Initiation Protocol (hereinafter SIP) Register message, originated from the given user towards the P-CSCF. This SIP Register message is forwarded from the P-CSCF towards a so-called Interrogating Call Session Control Function (I-CSCF) included in the IMS infrastructure, which is in charge of selecting a Serving Call Session Control Function (S-CSCF) for serving the user by performing, among others tasks, service control.

After having selected an S-CSCF, the I-CSCF forwards the user-originated Register message to the selected S-CSCF that, upon reception of this message, requests an IMS Service Profile for the given user from a so-called Home Subscriber Server (HSS) that holds subscriber data for the user. The IMS Service Profile, which is a sort of user profile, is a collection of service and user related data as defined in the 3GPP document "Technical Specification Group Core Network; IP Multimedia (IM) Subsystem Cx and Dx interfaces; Signalling flows and message contents (3GPP TS 29.228 version 6.5.0)" (hereinafter referred to as 3GPP TS 29.228).

Once the applicable IMS Service Profile for the user is received at the S-CSCF from the HSS, the S-CSCF may from now on perform session control services for the user, including services depending on the type of call, and maintain a session state as needed by the network operator for support of services.

Two significant aspects of the IMS development contribute to somewhat limit those services for which dialled number internationalization may apply and, even more, when applying services that depend on the type of call, national, international, or in selected countries. In this respect, the handling of dialled number formats for the purpose of the present invention is described in 3GPP TS 23.228 6.8.0. A first aspect is the selection of an S-CSCF in the home network for servicing the user, so that the session control for the user is in the home network. A second aspect is the access-independent paradigm that the IMS is aimed to.

Currently, 3GPP multimedia networks route the IMS SIP calls through the user's home network, even if the user is roaming in a visited network. In this case, the user's SIP session is routed to an S-CSCF assigned in the user's home network so that the locations of user and S-CSCF may actually be different from a geographical point of view. Moreover, since IMS is an access-independent domain, a user assigned with a P-CSCF in the home network is not considered to be roaming from an IMS perspective even though the selected access network could be outside the home network operator premises. Thus, the S-CSCF serving a user has no way of knowing in current IMS network architecture if the user is roaming and in which country. The S-CSCF knows only a network identifier of the P-CSCF, but it cannot derive the user's geographical location thereof.

This problem gets worse when the user attaches a GPRS network as selected access network, wherein the user accesses via a Serving GPRS Service node (SGSN) to a Gateway GPRS Service node (GGSN), and the GGSN physically resides in the user's home network; or when the user attaches a WLAN network as selected access network, wherein the user accesses via a WLAN Access Gateway (WAG) to a Packet Data Gateway (PDG), and the PDG physically resides in the user's home network. This is due to the fact that both GGSN and PDG traditionally assign a P-CSCF in the same network as they are, so that the information stored in the S-CSCF, which may include a network identifier of the P-CSCF, does not always allow to determine where the user is roaming. Hence, with the presently existing architecture and mechanisms in a 3GPP IMS network, the S-CSCF handles all SIP sessions initiated for a user as local to the country of the network where the P-CSCF belongs to, even if the user is actually in a visited network in another country.

A first problem perceived by users is that a user cannot dial E.164 numbers in the local format of the country where the user is roaming because the S-CSCF may assume that the number corresponds to the country of the home network. Hence, a roaming user must dial numbers in the visited network in international format rather than in a local format. This behaviour is different from the one currently supported in GSM that allows the use of local format for numbers in the visited network. Moreover, a uniform treatment of dialled numbers for roaming users can be seen as an advantage for users wanting such uniform treatment but, on the other hand, it may be regarded as a disadvantage for users wanting to customize the dialling in accordance with user preferences.

Under the existing approach, roaming users cannot specify whether they prefer to dial numbers belonging to the home network in local format or in international format. If they decide to dial numbers belonging to the home network in local format when roaming, they must then dial numbers belonging to the visited network in international format. The S-CSCF thus originates SIP sessions as locally originated in the user's home country rather than originated in the country where the user is roaming. As a consequence, restrictions based on international calls, or on international sessions, cannot be properly applied in the S-CSCF.

Therefore, an object aiming the present invention is the provision of a mechanism whereby roaming users can specify whether they prefer to dial numbers belonging to the home network in local format or in international format from the visited network where they are roaming.

A further object aiming the present invention is the appropriate treatment of restrictions based on the type of call, and depending on both user's geographical location and preferences, for dialled number formats when the user is roaming.

SUMMARY OF THE INVENTION

The above objects are accomplished by the present invention according to the claimed method and cooperating entities, which cooperate in the telecommunication network to carry out the method through enhancements and novel contributions provided for by the present invention.

There is thus provided a first co-operating entity, which in the instant specification is a home subscriber server, and is an entity in charge of subscriber data for subscribers of a home network that includes multimedia infrastructure operating in accordance with a 3GPP IP Multimedia subsystem, the home subscriber server having means for receiving from a selected access network information about the access location of a subscriber; and having at least one user profile for the subscriber, the user profile including a number of filtering criteria that may be applied to subscriber messages depending on a type of call.

This home subscriber server comprising means for submitting information about the access location of the subscriber along with the user profile for the subscriber towards a second co-operating entity, which in the instant specification is a serving call session control function, and is an en entity assigned to the subscriber in the home network for servicing said subscriber.

The serving call session control function entity is suitable for being assigned at a home network for servicing a home subscriber who registers into network multimedia infrastructure operating in accordance with a 3GPP IP Multimedia subsystem and, to this end, the serving call session control function entity has means for downloading a user profile for the subscriber, the user profile including a number of filtering criteria; and means for applying the filtering criteria to subscriber messages depending on a type of call.

This serving call session control function entity co-operates with the above home subscriber server and comprises, in accordance with the invention, means for receiving information about the access location of the subscriber along with the user profile; and means for applying the filtering criteria based on the received information about the access location of the subscriber.

The home subscriber server may be implemented so that the means for receiving information about the access location of a subscriber includes means for receiving an identifier of an access entity in the selected access network where the subscriber has accessed through. Apart from that, the home subscriber server may further include first processing means for deriving a country code and a national destination code from the received identifier of the access entity. Moreover, the home subscriber server may further include second processing means for determining in accordance with subscriber preferences whether the country code derived from the received identifier of the access entity, or the country code of the home network is included in the information about the access location of the subscriber.

The home subscriber server may be arranged in such manner that the information about the access location of the subscriber is included in the at least one user profile for the user.

On the other hand, the serving call session control function entity may further comprise means for performing dialled number internationalization based on the received information about the access location of the subscriber, and may also comprise means for applying services depending on the received information about the access location of the subscriber.

Moreover, the serving call session control function entity may be arranged so that a country code included in the information received about the access location of the subscriber is taken for performing dialled number internationalization irrespective of other information about the access location.

Still further, the serving call session control function entity may be arranged so that the filtering criteria include indications of roaming cases to be considered when applying the filtering criteria.

These entities co-operate in the telecommunication network to carry out a method for applying services at a serving call session control function entity of a home network, the services depending on roaming information of a home subscriber who registers into network multimedia infrastructure operating in accordance with a 3GPP IP Multimedia subsystem.

This method includes, in accordance with the invention, a step of receiving a user profile for the subscriber at the serving call session control function entity, the user profile including a number of filtering criteria; a step of applying at the serving call session control function entity the filtering criteria to subscriber messages depending on a type of call; a step of receiving at the serving call session control function entity information about the access location of the subscriber along with the user profile; and a step of applying at the serving call session control function entity the filtering criteria based on the received information about the access location of the subscriber.

This method may further comprise a step of performing internationalization of a dialled number based on the received information about the access location of the subscriber. Therefore, the method may further comprise a step of taking a country code, which is included in the information received about the access location of the subscriber, for performing the internationalization of the dialled number.

Apart from that, the method may further comprise a step of receiving a number of roaming cases at the serving call session control function entity, the roaming cases to be considered when applying the filtering criteria.

The above first and second co-operating entities may also co-operate with a third co-operating entity to carry out an embodiment of the invention, whereby a different treatment may be given to numbers directly dialled by the user and those dialled from a user's agenda incorporated in the terminal.

This third co-operating entity is a user terminal for accessing multimedia infrastructure of a telecommunication network through a selected access network, the user terminal including means for maintaining an agenda for the user with names and subscriber identifiers, such as numbers, addressing other subscribers. This user terminal has in accordance with the invention means for including an indicator during call establishment to inform the multimedia infrastructure when a dialled subscriber identifier is got from the agenda.

Therefore, the user terminal may be configured to always add an indicator when a dialled number was selected from the Agenda, or may be configured with user's preferences to allow the user to set such option in order to provide such indicator on a per number basis, or may be configured with user's preferences to send the indicator depending on user's preferences maintained in the multimedia infrastructure of the telecommunication network for setting therein a corresponding access location.

BRIEF DESCRIPTION OF DRAWINGS

The features, objects and advantages of the invention will become apparent by reading this description in conjunction with the accompanying drawings, in which.

DETAILED DESCRIPTION OF PREFERRED EMBODIMENTS

The following describes some preferred embodiments for allowing roaming users to specify whether they prefer to dial numbers belonging to the home network in local format or in international format from the visited network where they are roaming, as well as to dial numbers belonging to the visited network in the local format therein or in an international format. This selectable format for dialled numbers being also taken into account for applying services and restrictions that might depend on the type of call and on the user's geographical location.

Throughout the present specification, and for the sake of simplicity, no distinction is made between terms "user", "subscriber" and "user equipment", hereinafter abbreviated and referred to as "UE".

Figure 1:
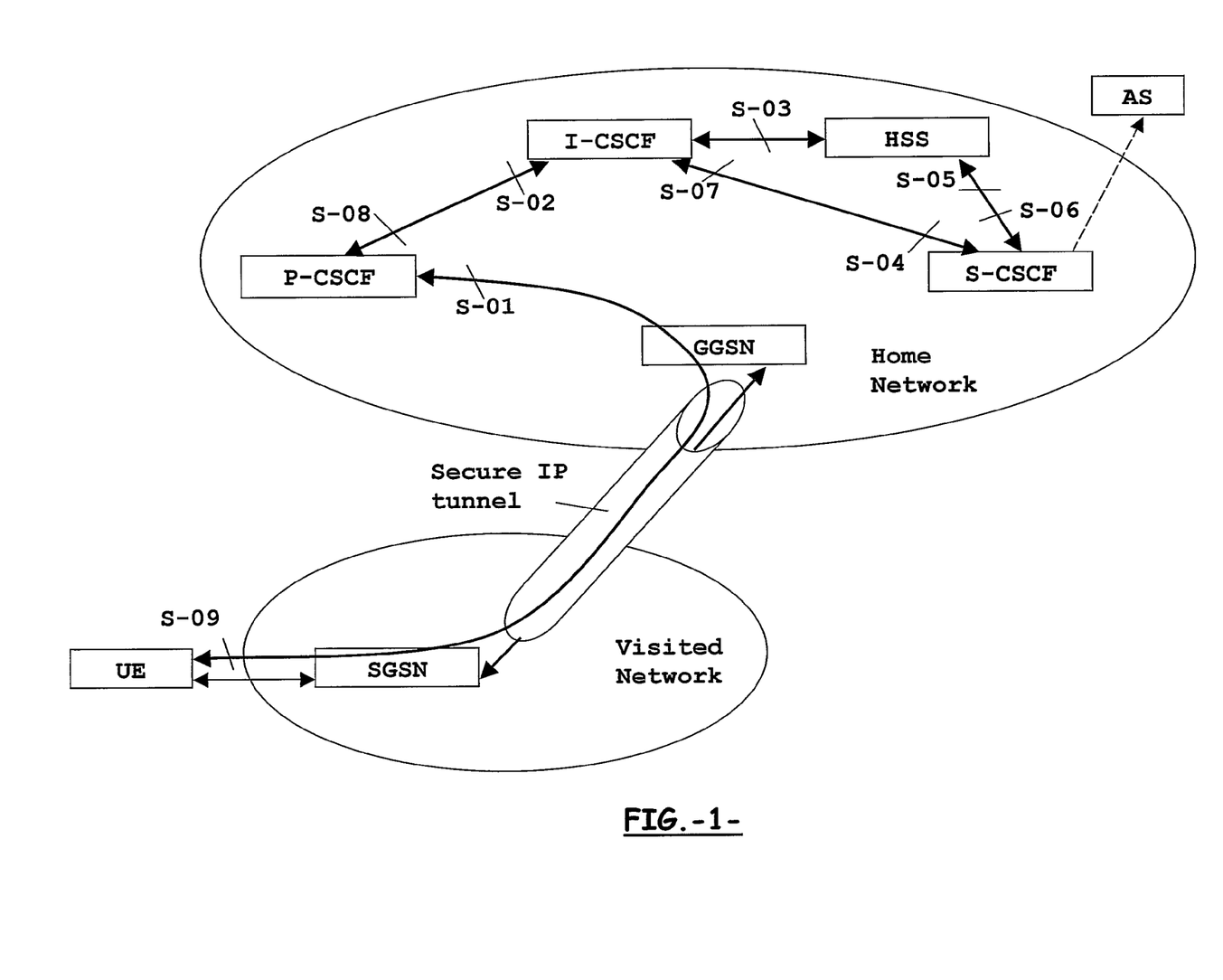
FIG. 1 is a basic diagram illustrating how a user may access to IMS through a GPRS network where the GGSN and P-CSCF are located in the home network.
Figure 5:
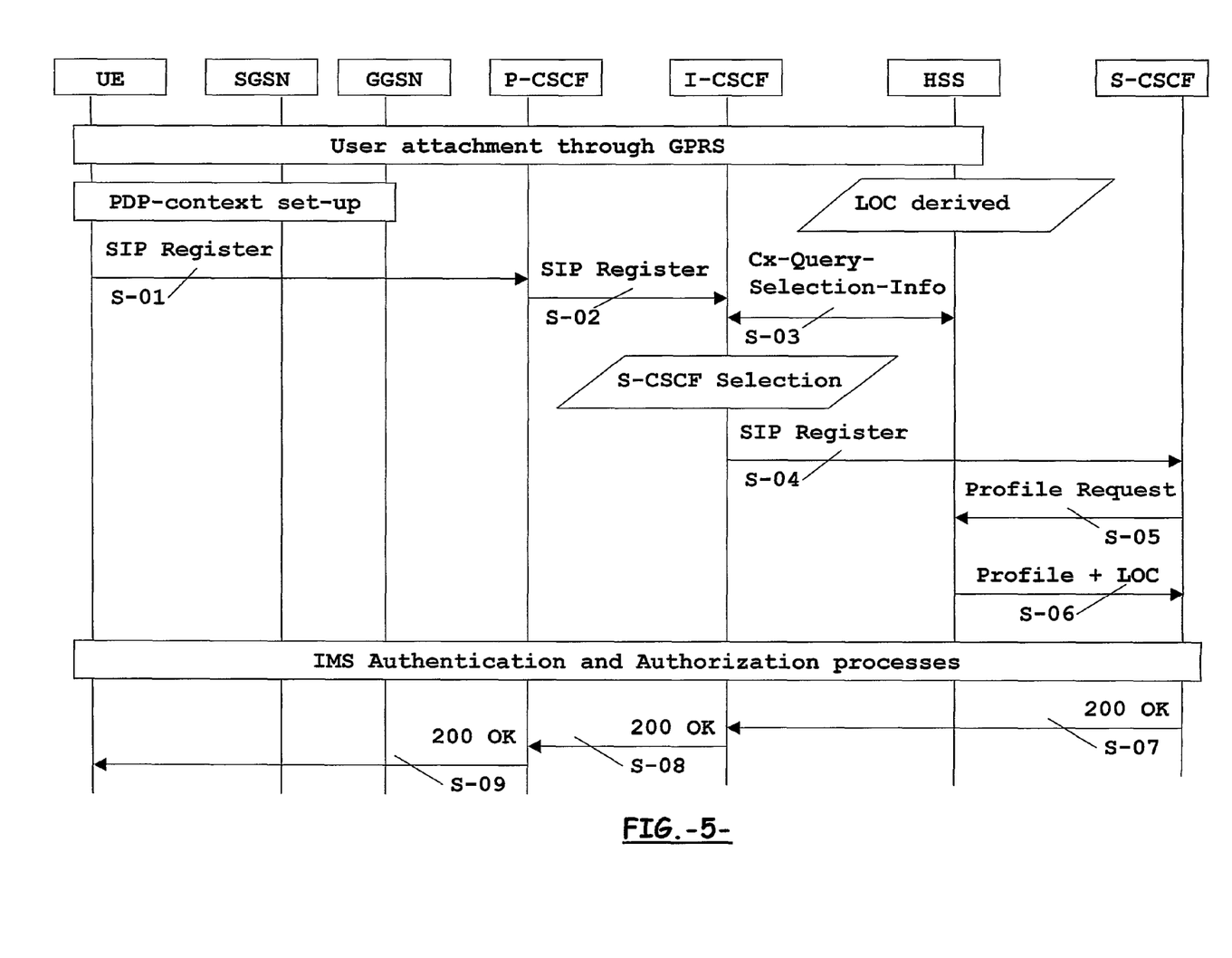
FIG. 5 illustrates a basic signalling flow to provide location data for a user to an S-CSCF assigned for serving the user, when the user accesses IMS through a GPRS network.

In a first embodiment of the present invention illustrated in FIG. 1 and FIG. 5, a user (UE) attaches a GPRS network as selected access network, by accessing via a Serving GPRS Service node (SGSN) to a Gateway GPRS Service node (GGSN), and carries out a so-called "PDP Context Activation" procedure, whereby an indication to further register into the IP Multimedia subsystem is implicitly or explicitly stated, as well as the needs for carrying out a "P-CSCF Discovery" procedure in order to assign the user with a P-CSCF.

As a consequence of the user attachment, and as part of an authentication of the user carried out by the home network for authorizing the user to access the selected access network, the HSS in charge of the user in the home network obtains an identifier of the SGSN where the user has accessed. The identifier of the SGSN being such that the HSS may derive information about the access location (LOC) of the user and store it.

During this "PDP Context Activation" procedure between the user and the GGSN, the user is assigned an IP address, thus getting the IP connectivity mentioned above. Also during the "PDP Context Activation" procedure, or immediately afterwards, a "P-CSCF Discovery" procedure is carried out to assign the user with a P-CSCF, which is the first contact point within the IP Multimedia subsystem, and behaves like a Proxy, thus accepting requests and servicing them internally, or forwarding them on.

Once the PDP Context has been activated and the user has got IP connectivity, the user may register into the IMS through the assigned P-CSCF. The P-CSCF assigned to the user is preferably in the same network as the GGSN where the user accesses from and, in this embodiment, they both belong to the home network where the user holds a subscription.

The registration of the user into the IMS, as shown in FIG. 1 and FIG. 5 where GPRS is the selected access network, may be carried out with a SIP Register message, originated from the given user (UE) and sent (S-01) towards the P-CSCF. This SIP Register message is forwarded (S-02) from the P-CSCF towards an I-CSCF included in the IMS infrastructure of the home network, which is in charge of selecting an S-CSCF for serving the user by performing, among others tasks, service control.

The selection of the S-CSCF is carried out at the I-CSCF taking into account capabilities that a selectable S-CSCF should have for fitting those service capabilities that the given user (UE) requires. The capabilities for an S-CSCF selection are provided (S-03) to the I-CSCF from an HSS, which is an entity of the home network (HPLMN) in charge of subscriber data for the given user.

Once an S-CSCF has been selected, the I-CSCF forwards (S-04) the SIP Register message originated by the user (UE) to the selected S-CSCF that, upon reception of this message, requests (S-05) an IMS Service Profile for the given user (UE) to the HSS holding the user's subscriber data. The IMS Service Profile is a sort of user profile, namely a collection of service and user related data, and may include so-called Initial Filter Criteria (IFC) to determine whether or not a SIP request has to be forwarded to any Application Server (AS).

These Initial Filter Criteria represent a sort of subscription to an application, and may include an identifier suitable for addressing an Application Server (AS) where the application runs, default handling indicators, trigger points, priority and service information. A trigger point defines a sub-set of initial SIP requests that should be forwarded to any particular Application Server (AS) referred to under an applicable Initial Filter Criterion. In principle, Initial Filter Criteria (IFC) are evaluated one by one for an initial SIP request.

There may be more than one user profile for the same user, and the selection of the applicable one is done at the HSS taking into account the one or more user identifiers that may be given in the user-originated SIP Register message.

Once the applicable IMS Service Profile for the user (UE) is selected by the HSS, including applicable IFC, the HSS fetches from storage the information about the access location (LOC) of the user that had been derived from the identifier of the SGSN under this first embodiment wherein the access network is a GPRS network.

In accordance with an aspect of the present invention applicable to this firstly described embodiment as well as to further disclosed embodiments, the HSS provides information about the access location (LOC) to the S-CSCF in an appropriate form to simplify its handling in the S-CSCF. Basically two kinds of information are considered, even though other ones may be advantageously considered as well, to carry out a dialled number internationalisation and to apply services depending on the roaming information.

A first kind of information to be provided may be a Country Code (CC) to be used for internationalisation of the dialled numbers. Therefore, a new field may be included in the IMS profile to be provided in a Cx-put-response operation indicating the CC to be used for number internationalisation purposes. The HSS has user data information to define the user preferences on whether using local numbers in the format of the visited network or always in format of the home network.

The HSS may thus provide an appropriate CC to be used for number internationalisation, and the CC being selected in accordance with the following user preferences:
(a) if the user prefers always dialling local numbers as in the home network, the HSS sends the CC of the home network;
(b) if the user prefers dialling the local numbers of the network where the user is roaming, the HSS retrieves from storage the CC derived from the identifier of the SGSN under this embodiment where the user is attached. Note that in case the SGSN is in the home country the CC of the home network is the one provided to the S-CSCF;
(c) if the user prefers a combined case where the user wishes dialling local numbers as in the home network for numbers stored in the terminal agenda, in which case the terminal adds a flag indicating that the dialled number was selected from the agenda, and dialling local numbers of the visited network in their corresponding local format otherwise.

A second kind of information to be provided may be a roaming case for analysing services that depend on roaming. Therefore, a new field may be included in the IFCs of the IMS profile to be downloaded in the Cx-put-response operation to the S-CSCF indicating the roaming cases to be considered during evaluation of Trigger Points. These roaming cases may include, for example: International destinations and International destinations except HPLMN country. These roaming cases may be used to determine whether an IFC is applicable as analysing a dialled number in relation with the CC downloaded. Other fields not included in the IFCs of the IMS profile might be used as well not departing from the original purpose behind this invention.

Referring back again to FIG. 1 and FIG. 5, and once the IMS Service Profile is selected for the user and the information about the access location (LOC) is retrieved, the HSS sends (S-06) them towards the S-CSCF. As receiving the IMS profile and the access location (LOC) for the user (UE), the S-CSCF can perform session control services for the user, apply IFC's depending on the type of call, and maintain a session state as needed by the network operator to support services that depend on the geographical location of the user. That is, the S-CSCF may handle SIP INVITE operations received from the user side (UE) by replacing the dialled numbers with those numbers internationalised according to the access location (LOC) received from the HSS, and applying the roaming cases defined during the evaluation of the Trigger Points.

Figure 3:
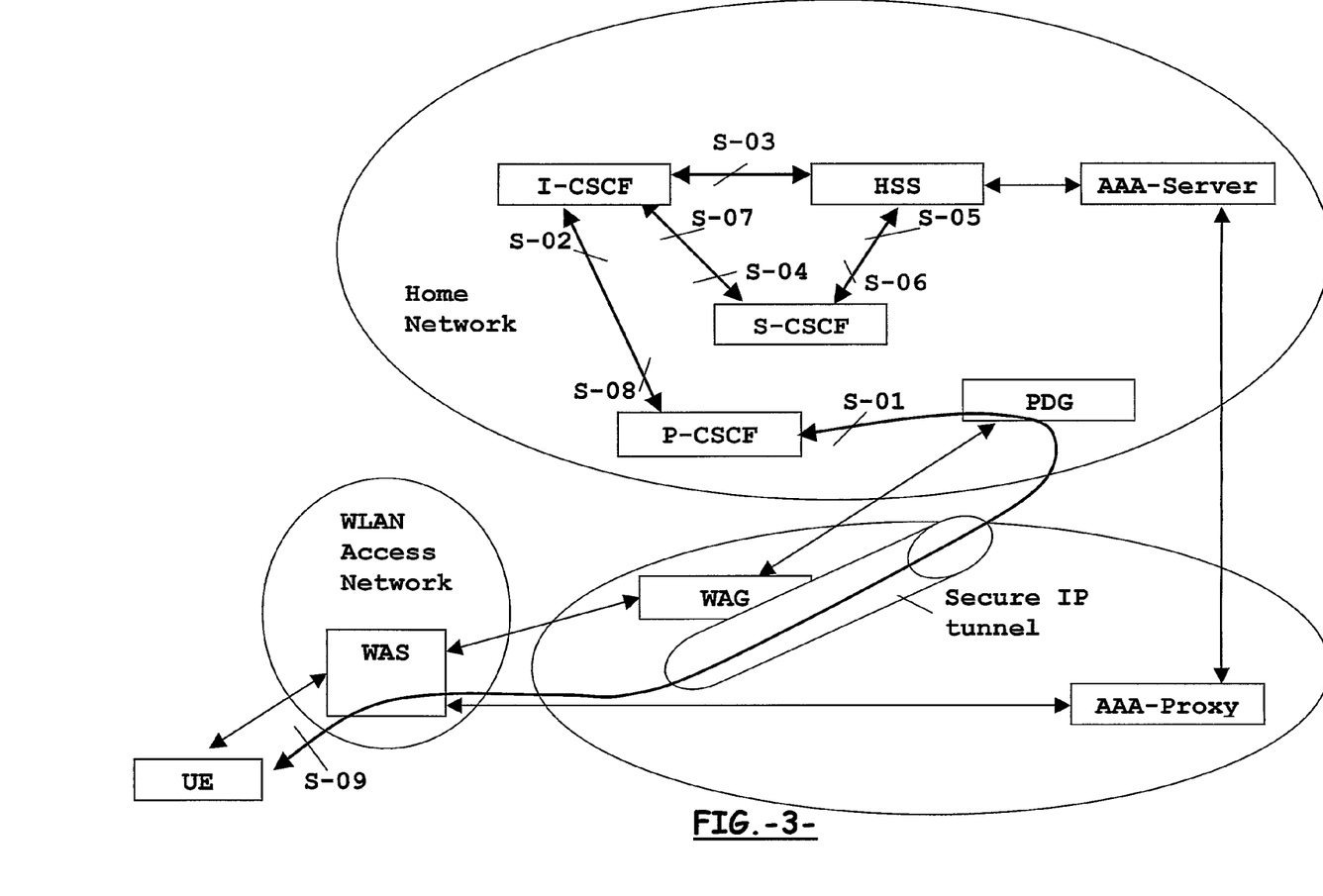
FIG. 3 is a basic diagram illustrating how a user may access to IMS through a WLAN network where the PDG and P-CSCF are located in the home network.
Figure 6:
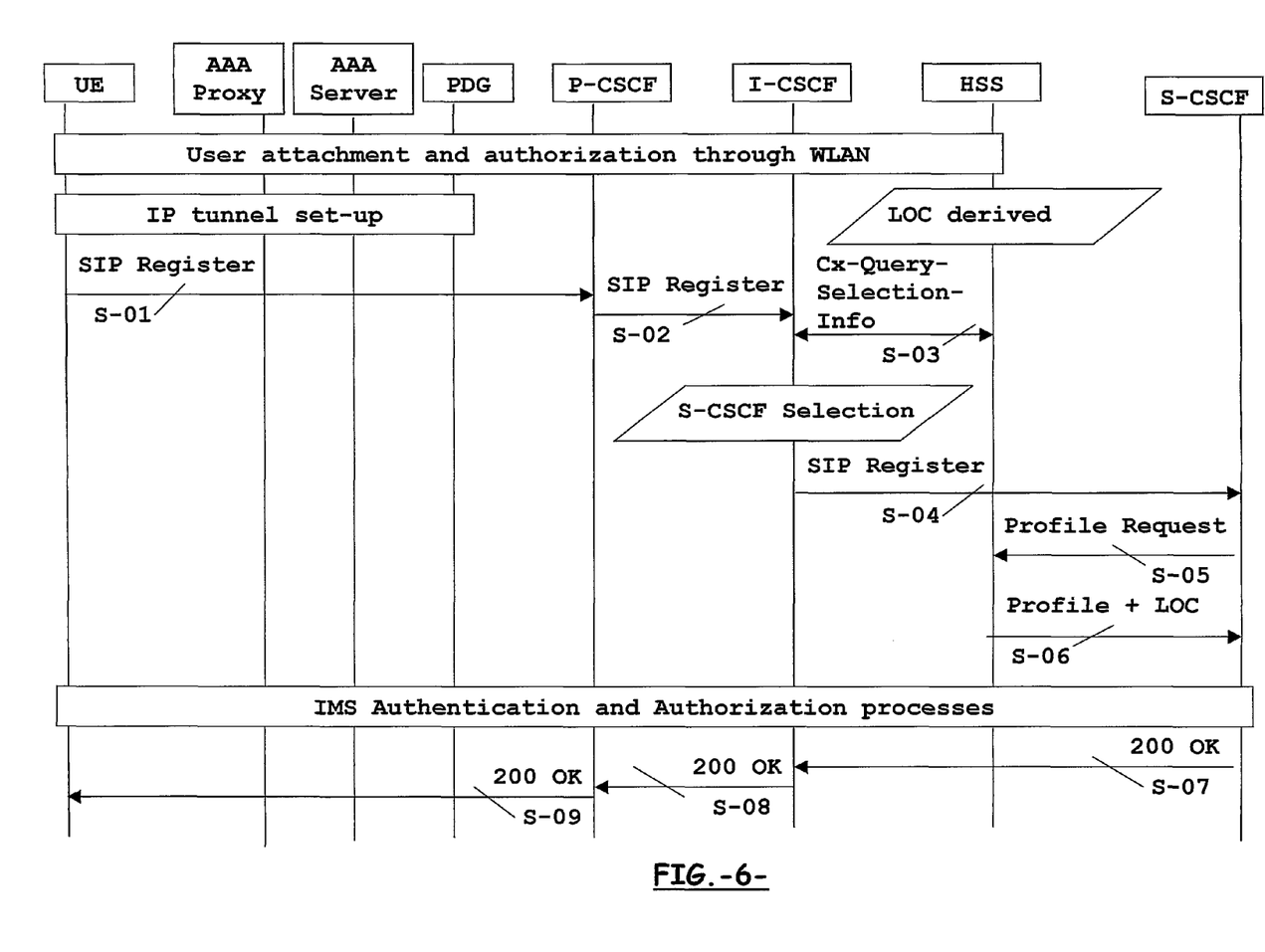
FIG. 6 illustrates a basic signalling flow to provide location data for a user to an S-CSCF assigned for serving the user, when the user accesses IMS through a WLAN network.

In a second embodiment of the present invention illustrated in FIG. 3 and FIG. 6, a user (UE) attaches a WLAN network as selected access network, by accessing firstly via a WLAN Access Server (WAS) to a so-called "Authentication, Authorisation and Accounting" (AAA) proxy (AAA Proxy) in the visited network and from there towards an "Authentication, Authorisation and Accounting" server (AAA Server) in the home network, or directly from the WLAN Access Server (WAS) to the "Authentication, Authorisation and Accounting" server (AAA Server) in the home network if no roaming condition occurs, in order to authorize the user to access such WLAN access network. Once such authorization is obtained, the user may provide an indication, implicitly or explicitly, to further register into the IP Multimedia subsystem, as well as the needs for carrying out a "P-CSCF Discovery" procedure in order to assign the user with a P-CSCF, by accessing via a WLAN Access Gateway (WAG) to a Packet Data Gateway (PDG).

As consequence of the user attachment to WLAN, the HSS is informed of the AAA Proxy where the subscriber is roaming. Alternatively, or additionally, to an AAA Proxy identifier, the HSS may obtain an identifier of the WLAN Access Gateway (WAG) from where the user is accessing a visited network as well as an identifier of the Packet Data Gateway (PDG) and, even more, an accurate location of the user obtainable from positioning functions in the WLAN network. The HSS may, by extending the procedures for WLAN access to 3GPP networks, thus receive information related to the network where the user is accessing, and may thus maintain tables that allow deriving a Country Code and a National Destination Code, if possible, to be used in the roaming network.

Likewise for a GPRS access network, the user accessing through a WLAN access network is assigned an IP address, thus getting the IP connectivity mentioned above, and is assigned a P-CSCF as an entry point for accessing the IMS infrastructure. Therefore a so-called IP tunnel is set-up for security reasons whereby communications between the user (UE) and the Packet Data Gateway (PDG) are prevented from an IP address spoofing for the IP address that the user is assigned for identification purposes.

Then, the user (UE) may access to IMS in a similar manner as done when accessing through a GPRS access network, and as illustrated in FIG. 3 and FIG. 6, by sending (S-01) a SIP Register message originated from the given user (UE) to the assigned P-CSCF. This SIP Register message is forwarded (S-02) from the P-CSCF towards the I-CSCF in the IMS part of the home network, for selection of an S-CSCF for serving the user and for service control.

The I-CSCF requesting (S-03) capabilities that a selectable S-CSCF should have for fitting those service capabilities that the given user (UE) requires, and the HSS providing (S-03) such capabilities. Once an S-CSCF has been selected, the I-CSCF forwards (S-04) the SIP Register message originated by the user (UE) to the selected S-CSCF that, upon reception of this message, requests (S-05) an IMS Service Profile for the given user (UE) to the HSS holding the user's subscriber data.

Thereafter, the HSS sends (S-06) towards the S-CSCF the IMS profile and the access location (LOC) for the user (UE), the latter preferably including at least one of the two kinds of information as disclosed above in accordance with an aspect of the present invention. As for the embodiment where the selected access network was a GPRS network, as receiving the IMS profile and the access location (LOC) for the user (UE), the S-CSCF can perform session control services for the user, apply IFC's depending on the type of call, and maintain a session state as needed by the network operator to support services that depend on the geographical location of the user.

In other words, the S-CSCF may handle SIP INVITE operations received from the user side (UE) by replacing the dialled numbers with the internationalised ones and applying the roaming cases defined during the evaluation of the Trigger Points.

Figure 2:
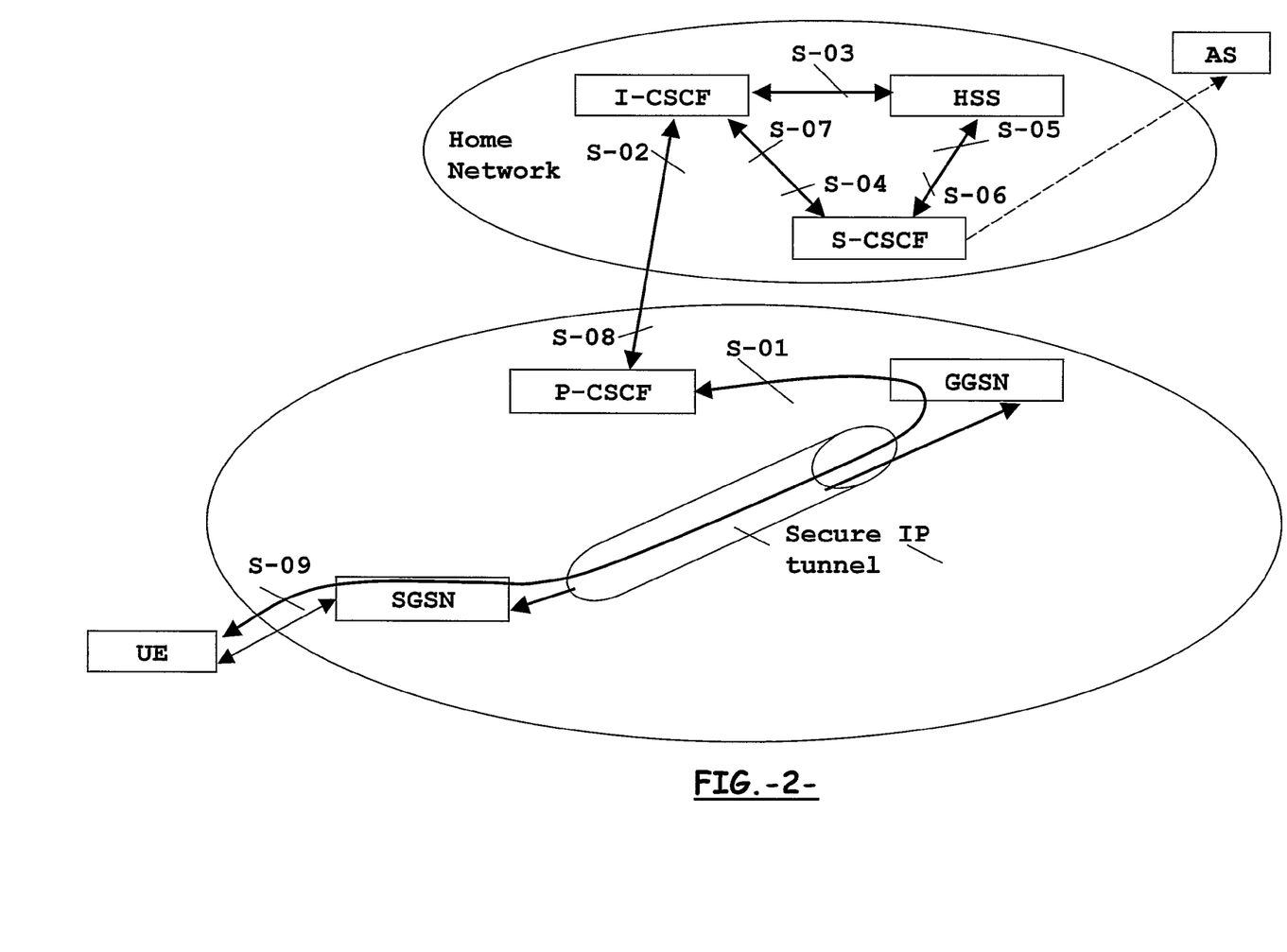
FIG. 2 is a basic diagram illustrating how a user may access to IMS through a GPRS network where the GGSN and P-CSCF are located in the visited network.
Figure 4:
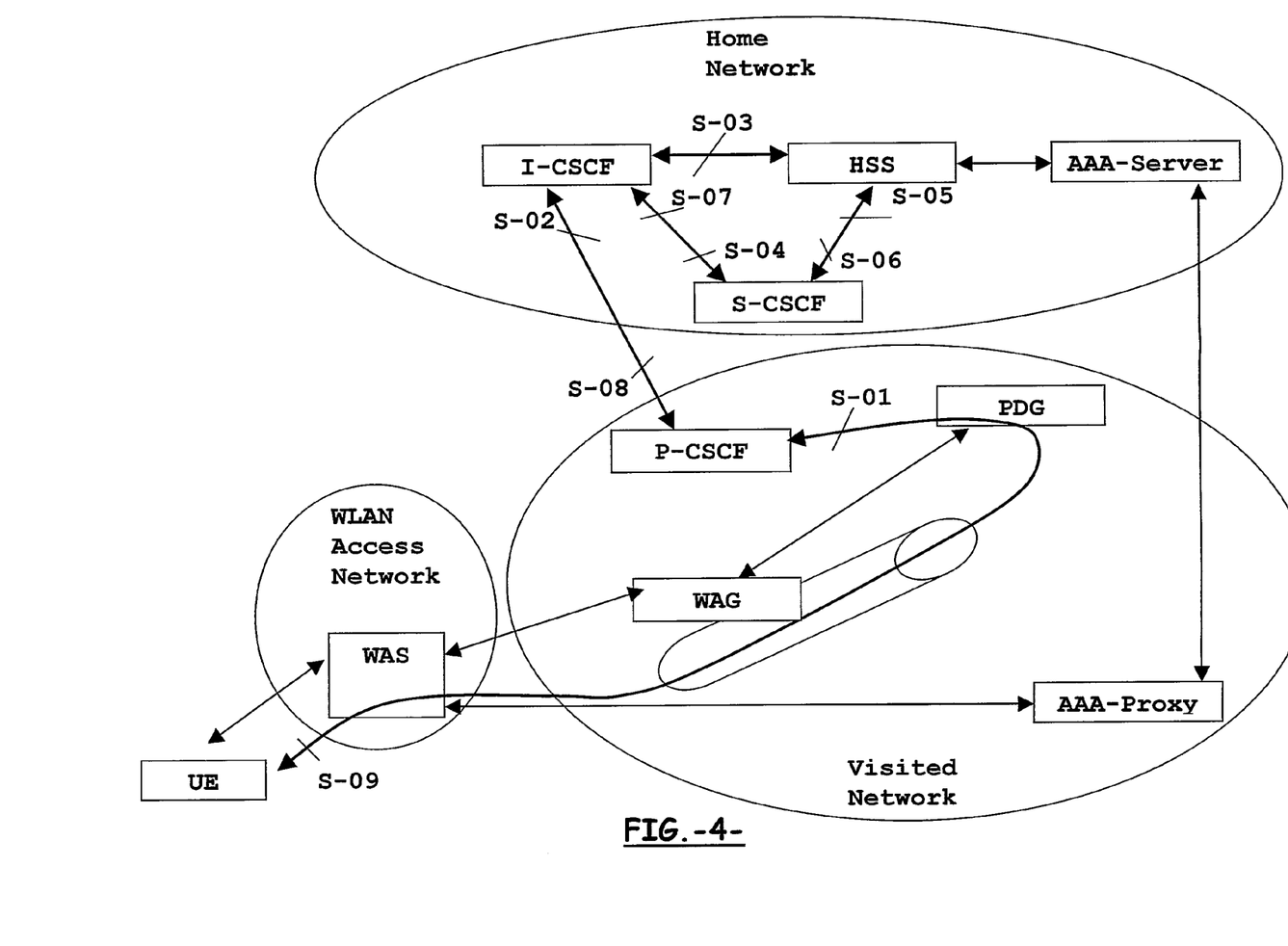
FIG. 4 is a basic diagram illustrating how a user may access to IMS through a WLAN network where the PDG and P-CSCF are located in the visited network.

Apart from these embodiments respectively illustrated firstly in FIG. 1 and FIG. 5, and secondly in FIG. 3 and FIG. 6, the present invention is also applicable to other embodiments such as those respectively illustrated in FIG. 2 for a GPRS as selected access network where the P-CSCF is in a visited network, and in FIG. 4 for a WLAN as selected access network where the P-CSCF is also in a visited network.

Three exemplary use cases are described following this where the embodiments of the invention are applied in a Multimedia network in an illustrative and non-restrictive manner.

Figure 7:
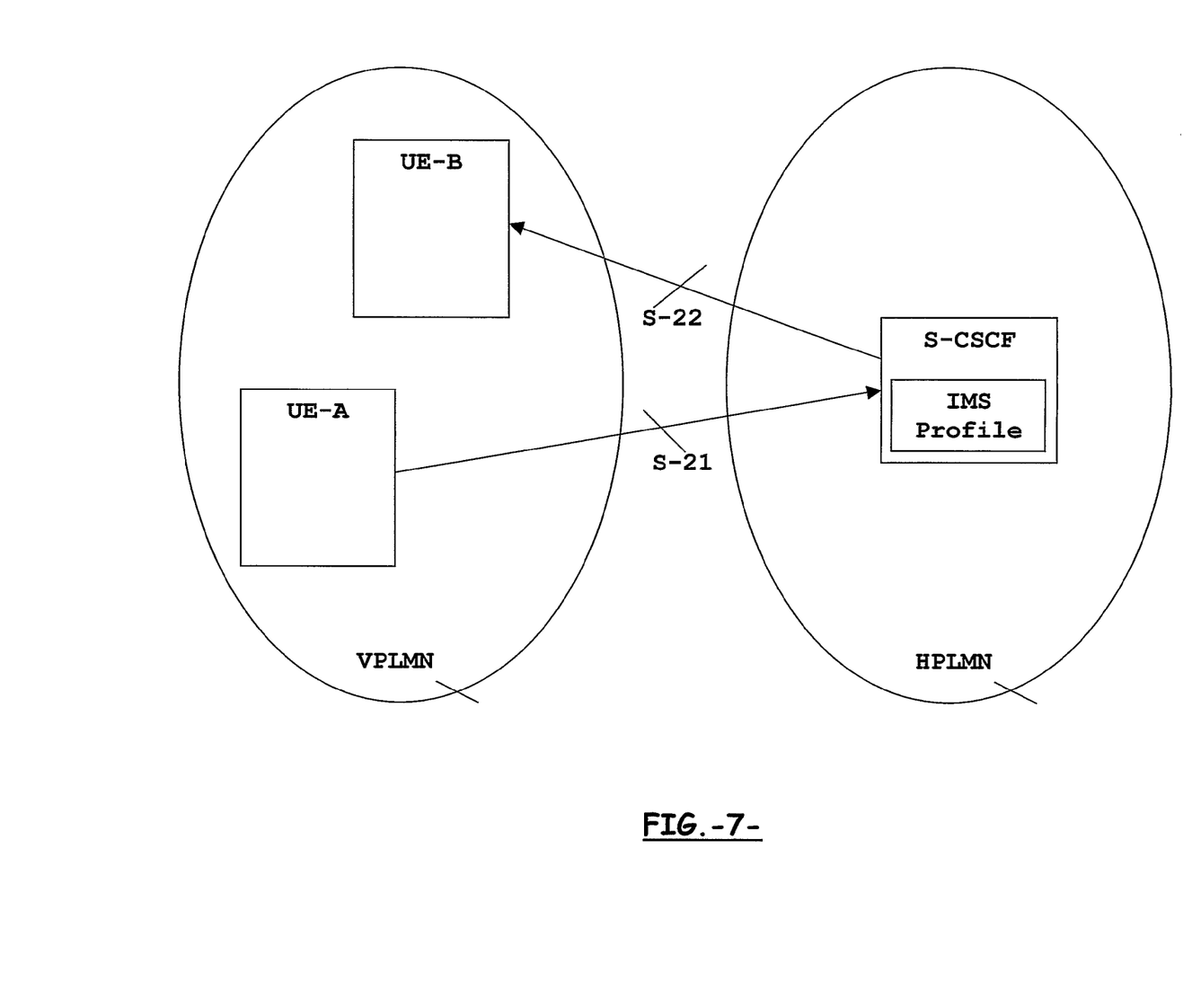
FIG. 7 shows a basic diagram illustrating a first use case where calling and called users are located in the visited network.

In a first use case illustrated in FIG. 7, a user (UE) acting as A party (UE-A) dials the number of B party in accordance with the numbering plan of a visited network (VPLMN) where the A party is roaming, that is, without any international access code such as "+" or country code. The SIP session thus originated is routed (S-21) to an S-CSCF in the A party's home telecom network (HPLMN). The S-CSCF downloads an IMS profile for the A party user (UE) from the HSS, along with a registration status that includes the roaming status and with an access location (LOC) that includes the Country code (CC) of the visited network (VPLMN).

In this situation, the S-CSCF may check whether a corresponding IFC can be triggered for the roaming user, hence avoiding fraud and security holes, and if such triggering is allowed, and provided that the user had requested the dialling of numbers in local format of the visited network, the S-CSCF may add "+CC" to the dialled number. After having carried out this internationalisation of the dialled number the S-CSCF may route (S-22) the SIP session to the B party user (UE-B) in the visited network (VPLMN).

Figure 8:
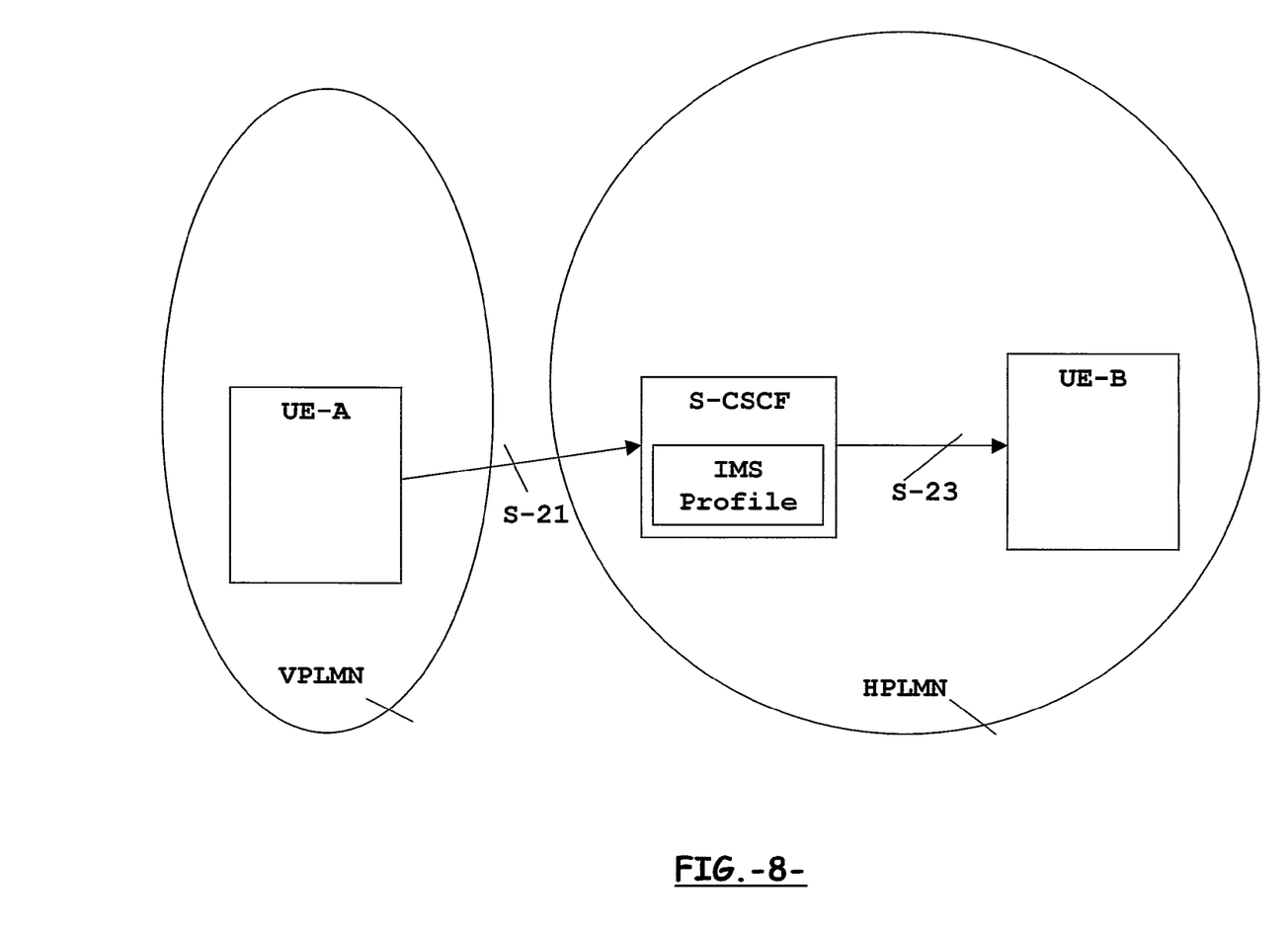
FIG. 8 shows a basic diagram illustrating a second use case where the calling user is located in the visited network and the called user is located in the home network.

In a second use case illustrated in FIG. 8, an A party user (UE-A) wishes to dial numbers belonging to the home network in the local format of the home network irrespective of the visited network where the user is roaming. In this use case, the user (UE-A) dials the number of B party (UE-B) in the home network (HPLMN) in accordance with the numbering plan of the home network where A party user (UE-A) belongs, that is, without any international access code such as "+" or country code. The SIP session thus originated is routed (S-21) to an S-CSCF in the A party's home telecom network (HPLMN), where the S-CSCF downloads an IMS profile for the A party user (UE-A) from the HSS, along with a registration status that includes the roaming status and with an access location (LOC) that includes the Country code (CC) of the home network.

As for the previous use case, the S-CSCF may check whether a corresponding IFC can be triggered for the roaming user, hence avoiding fraud and security holes, and if such triggering is allowed, and provided that the user had requested the dialling of numbers in local format of the home network, the S-CSCF may add "+CC" to the dialled number. After having carried out this internationalisation of the dialled number the S-CSCF may route (S-23) the SIP session to the B party user (UE-B) in the home network (VPLMN).

Figure 9:
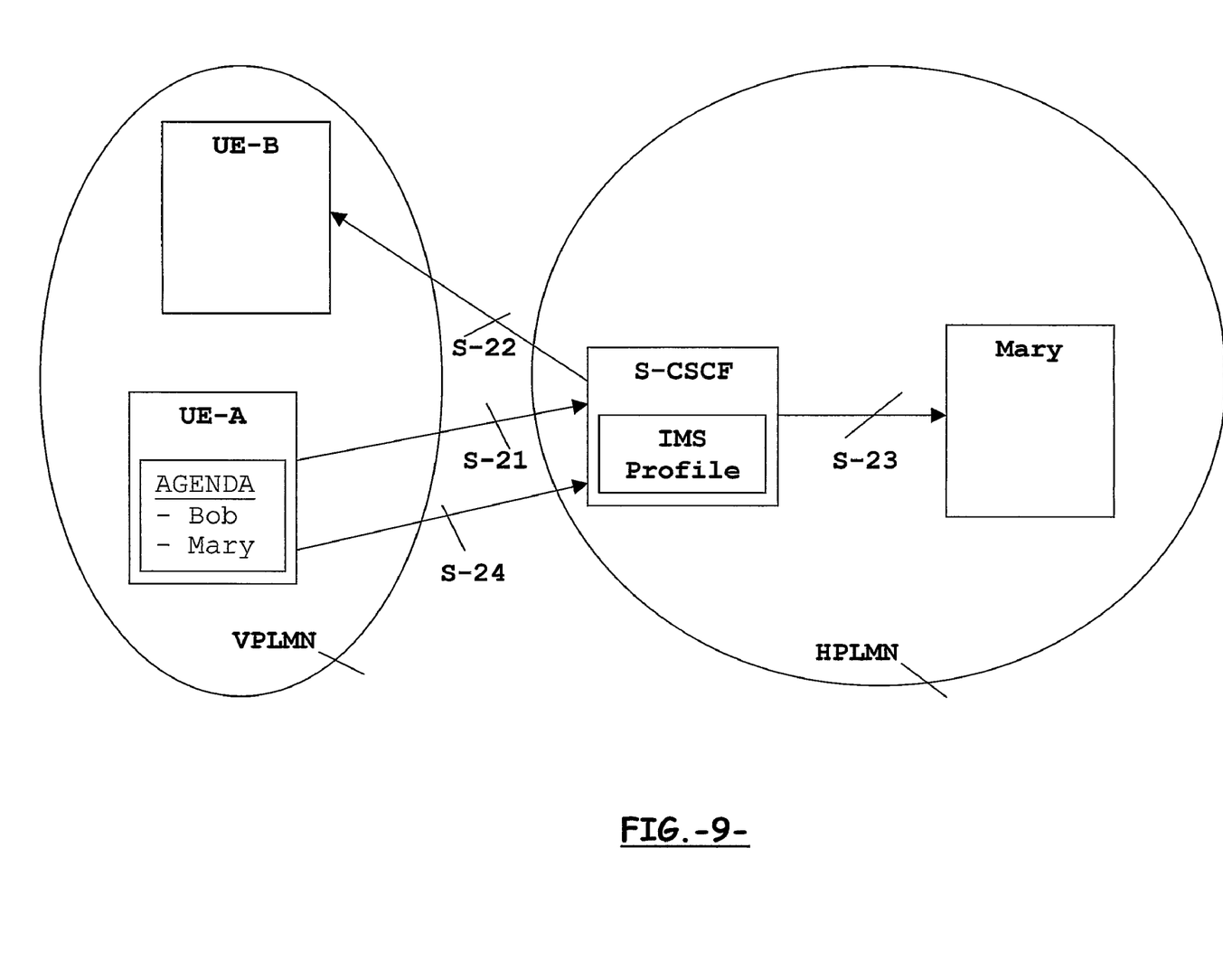
FIG. 9 shows a basic diagram illustrating a third use case where the calling user is located in the visited network and there is a different treatment for calls to a called user by dialling the number or by using the number in the user's agenda.

The third use case is a combined case illustrated in FIG. 9 where an A party user (UE-A) wishes to dial numbers, in the local format of the visited network (VPLMN) where the user is roaming, and those numbers stored in the Agenda and belonging to home network (HPLMN) being dialled in the local format of the home network (HPLMN) without adding any international access code such as "+" or country code.

In this use case, the user (UE-A) dials the number of B party user (UE-B) in the visited network (VPLMN) in accordance with the numbering plan of the visited network where the A party user (UE-A) is roaming, that is, without any international access code such as "+" or country code. As for previous use cases, the SIP session thus originated is routed (S-21) to an S-CSCF in the A party's home telecom network (HPLMN), where the S-CSCF downloads an IMS profile for the A party user (UE-A) from the HSS, along with a registration status that includes the roaming status and with an access location (LOC) that includes the country code (CC) of the visited network (VPLMN).

As for the first use case, the S-CSCF may check whether a corresponding IFC can be triggered for the roaming user, hence avoiding fraud and security holes, and if such triggering is allowed, and provided that the user had requested the dialling of numbers in local format of the visited network, the S-CSCF may add "+CC" to the dialled number. After having carried out this internationalisation of the dialled number the S-CSCF may route (S-22) the SIP session to the B party user (UE-B) in the visited network (VPLMN).

However, provided that the user (UE-A) selects "Mary" from the Agenda, and provided that the stored number for "Mary" is in the format of the numbering plan of the home network to which A party user (UE-A) belongs, that is, Mary's number not including any international access code such as "+" or country code, the user terminal (UE-A) may add to the SIP message a flag indicating that this number was selected from the user's Agenda in the terminal when sending (S-24) a SIP INVITE to Mary.

Therefore, the user terminal may be configured to always add an indicator when a dialled number was selected from the Agenda, or may be configured with user's preferences to allow the user to set such option in order to provide such indicator on a per number basis, or may be configured with user's preferences to send the indicator depending on the user's preferences in the HSS for setting a corresponding access location (LOC) that allow the choice under this third use case.

More specifically, and as in previous use cases, the SIP session thus originated is routed (S-24) to an S-CSCF in A party's home telecom network (HPLMN), where the S-CSCF downloads an IMS profile for the A party user (UE-A) from the HSS, along with a registration status that includes the roaming status and with an access location (LOC) that includes the Country code (CC) of the visited network (VPLMN). After having checked at the S-CSCF whether a corresponding IFC can be triggered for the roaming user for precluding fraud and security holes, and if such triggering is allowed, and since the A party user (UE-A) had requested selection of numbers from the Agenda which are stored in accordance with the local format of the home network (HPLMN), the S-CSCF adds the "+CC" of home network to the number. To this end, the S-CSCF had processed the flag indicating that this number was selected from the agenda and does not include the country code of the visited network that was received from the HSS. If the B party number selected from the agenda already included a corresponding "+CC" of the home network, then the flag is ignored.

After having carried out this internationalisation of the dialled number, the S-CSCF may route (S-23) the SIP session to "Mary" in the home network (HPLMN).

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A home subscriber server (HSS) for storing and controlling subscriber data for subscribers of a home network that includes a multimedia infrastructure operating in accordance with a Third Generation Partnership Project (3GPP) Internet Protocol (IP) Multimedia subsystem, the home subscriber server comprising:
    means for receiving from an access network, information about the access location of a subscriber, the received information including an identifier of an access entity in the access network through which the subscriber has requested access;
    a user profile for the subscriber, the user profile including a number of filtering criteria that are selectively applied to subscriber messages depending on a type of call;
    first processing means for deriving a country code (CC) from the received identifier of the access entity;
    second processing means for determining in accordance with subscriber preferences, a selected country code usable for number internationalization and to be included by the HSS in the information about the access location of the subscriber, the selected country code being either the country code derived from the received identifier of the access entity or the country code of the home network; and
    means for submitting the information about the access location of the subscriber, which includes the selected country code as determined, along with the user profile towards a serving call session control function (S-CSCF) entity assigned to the subscriber in the home network.

2. The home subscriber server of claim 1, wherein the first processing means are arranged for deriving a national destination code (NDC) from the received identifier of the access entity.

3. The home subscriber server of claim 2, wherein the derived NDC is included in the information submitted towards the serving call session control function about the access location.

4. The home subscriber server of claim 1, wherein the information submitted towards the serving call session control function about the access location includes a roaming case usable for analyzing services that depend on roaming.

5. The home subscriber server of claim 1, wherein the information about the access location of the subscriber is included in the at least one user profile for the user.

6. A method in a home subscriber server (HSS) for storing and controlling subscriber data for subscribers of a home network having a multimedia infrastructure operating in accordance with a Third Generation Partnership Project (3GPP) Internet Protocol (IP) Multimedia subsystem, the method comprising the steps of:
    storing in a user profile for the subscriber, a number of filtering criteria that are selectively applied to subscriber messages depending on a type of call;
    receiving from an access network, information about the access location of a subscriber, the received information including an identifier of an access entity in the access network through which the subscriber has requested access;
    deriving a country code (CC) from the received identifier of the access entity;
    determining, in accordance with subscriber preferences, a selected country code usable for number internationalization and to be included by the HSS in the information about the access location of the subscriber, the selected country code being either the country code derived from the received identifier of the access entity or the country code of the home network; and
    submitting the information about the access location of the subscriber, which includes the selected country code as determined, along with the user profile towards a serving call session control function (S-CSCF) entity assigned to the subscriber in the home network.

7. The method of claim 6, wherein the step of deriving a country code (CC) from the received identifier of the access entity includes deriving a national destination code (NDC) from the received identifier of the access entity.

8. The method of claim 7, wherein the step of submitting the information also includes submitting the derived NDC to the S-CSCF.

9. The method of claim 6, wherein the step of submitting the information also includes submitting to the S-CSCF, a roaming case usable for analyzing services that depend on roaming.

10. The method of claim 6, wherein the information about the access location of the subscriber is included in the at least one user profile for the user.

* * * * *